H. E. BROCK.
BASKET AND PACKAGE.
APPLICATION FILED MAR. 6, 1919.
1,323,521.
Patented Dec. 2, 1919.
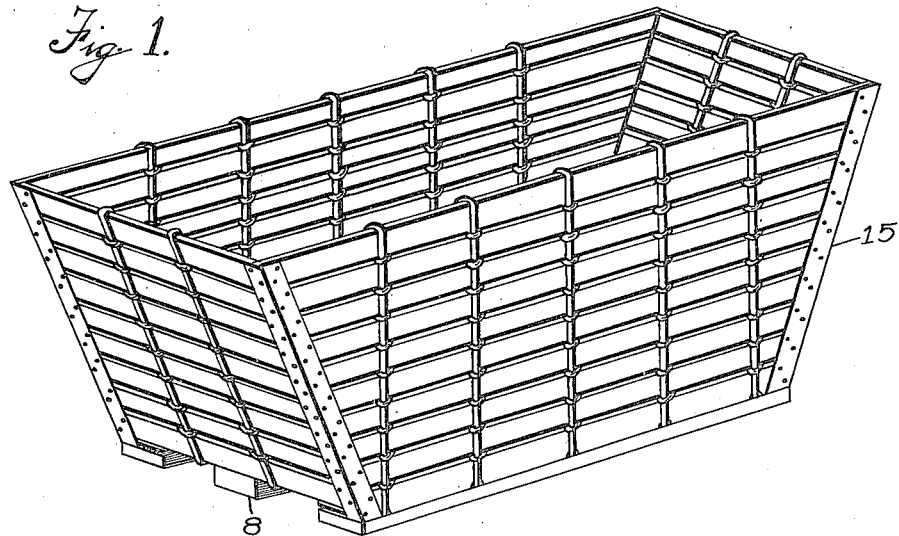
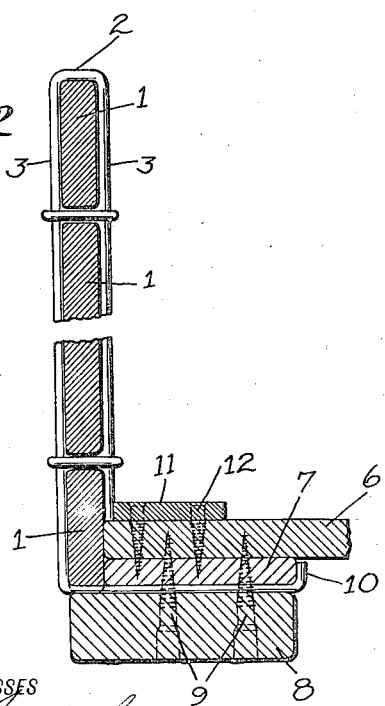
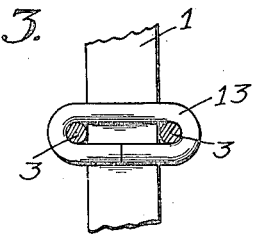
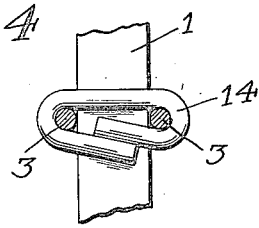
WITNESSES
INVENTOR
H. E. Brock
BY
ATTORNEYS

UNITED STATES PATENT OFFICE.

HENRY E. BROCK, OF HANCOCK, MICHIGAN.

BASKET AND PACKAGE.

1,323,521.

Specification of Letters Patent.

Patented Dec. 2, 1919.

Application filed March 6, 1919. Serial No. 280,968.

*To all whom it may concern:*

Be it known that I, HENRY E. BROCK, a citizen of the United States, and a resident of Hancock, in the county of Houghton and State of Michigan, have invented certain new and useful Improvements in Baskets and Packages, of which the following is a specification.

My invention is an improvement in baskets and crates, and the invention has for its object to provide a crate or basket composed of wooden slats joined together by metal wires, wherein the structure of the crate or basket may be quickly built up and will be held firmly in place by the wires.

In the drawings:

Figure 1 is a perspective view of the improved crate or basket;

Fig. 2 is a vertical section;

Fig. 3 is a detail section showing one form of connecting ring;

Fig. 4 is a similar view of another form.

In the present embodiment of the invention the walls of the basket are composed of slats 1 of wood or the like arranged one above the other, and held in the same plane and in spaced relation by wiring to be described. A series of substantially U-shaped pieces of wire is provided in connection with each wall; each of the said wires consisting of a body 2 extending transversely of the top of the wall and arms 3 extending downwardly on opposite faces of the wall.

The bottom 6, which may be of any suitable material and built up in any suitable manner has, on the under side, strips 7 extending longitudinally of the bottom at the opposite sides thereof. Slats or skids 8 are connected with the bottom, in the present instance three of the said skids being used, one at each side and one in the center, and the side skids are secured to the strip 7 and to the bottom 6 by means of screws 9, the said screws being countersunk in the skids. One end of the outermost arm 3 of each of the U-shaped wires of the side walls is bent inwardly between the lowermost slat 1, the strip 7 and the adjacent skid 8, as shown in Fig. 2, the extremity of the said arm being bent upwardly as shown at 10 to lie along the inner edge of the strip.

The other arm 3 is held between the lowermost slat 1 and a strip 11 which is secured to the bottom at the side thereof, by means of countersunk screws 12. As before stated, the slats are arranged between the arms 3 of the wires 2—3, and between the adjacent slats are arranged loops or rings 13, the said loops or rings extending transversely between the slats and engaging both arms of the adjacent wire.

In building the wall, the slats are placed between the arms 3 of the wires 2—3, and the rings are slipped down over the wires as the slats are placed. The rings are of such length that the wires will be slightly compressed at the joint between the slats. The said loops or rings may be as shown in Fig. 3, wherein the loops are formed from wire bent to cause their ends to abut, or they may be as shown in Fig. 4, wherein the loops are formed from single pieces of wire, which are so bent that their ends lie alongside each other.

The loops or rings might be of any desired shape, but to provide for the minimum of material they are preferably as shown in Fig. 3. The ends might be connected if desired. The end walls are composed in practically the same manner, the ends of the outer arms 3 of the wires 2—3 being bent inwardly to lie along the under face of the bottom. The walls may have their ends beveled or inclined as shown for the side walls in Fig. 1, or their ends may be straight as shown for the end walls in the said figures, and the corners of the crate or basket are connected by angle plates 15, the said angle plates being secured to the abutting ends of the slats forming the side and end walls. Since no staples are used there is no danger of splitting the slats and very thin slats may be used, and there is no injury to the slats due to weaving of the wire backward and forward between the same as in the usual construction.

I claim:

1. In a basket, a wall comprising a plurality of slats arranged in the same plane in edge to edge relation, the basket further including a bottom to the edge of which the lowermost slat is secured, a plurality of inverted U-shaped wire members disposed upon the wall with their bights engaging over the edge of the uppermost slat and their arms engaging against the sides of the slats, means connecting the arms between said slats, said arms being of unequal length and the one at the inner face of the wall terminating at the top of said bottom and the other arm being laterally directed and extending beneath said bottom.

2. A basket comprising a bottom, sides, and ends, said sides and ends being identical in construction and each including a plurality of slats arranged in edge to edge relation with the lowermost slat disposed against the edge of the bottom, a strip secured beneath the bottom adjacent each side, a plurality of inverted U-shaped wire members engaging over said sides and ends with their bight portions engaging over the upper edges of the topmost slats and their arms engaging against the inner and outer faces, means extending between the slats and connecting the arms of each wire member, the arms of each wire member being of unequal length, the inner one terminating at the top of said bottom, a slat secured upon said bottom and engaging the lower end of the inner arm, the other arm of the wire member being laterally deflected and extending beneath said strip with its terminal directed upwardly toward said bottom, and a skid secured beneath the bottom at each side thereof beneath the laterally directed portions of the arms.

HENRY E. BROCK.

Witnesses:
CHARLES SANDERS,
ALBIN L. HEDBERG.